United States Patent
Yeh et al.

(10) Patent No.: US 8,797,635 B2
(45) Date of Patent: Aug. 5, 2014

(54) COLOR ELECTROPHORETIC DISPLAY

(75) Inventors: Chia-Chun Yeh, Hsinchu (TW); Chi-Sheng Jiang, Hsinchu (TW); Henry Wang, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/414,694

(22) Filed: Mar. 7, 2012

(65) Prior Publication Data

US 2013/0003165 A1  Jan. 3, 2013

(30) Foreign Application Priority Data

Jun. 28, 2011  (TW) .............................. 100122679 A

(51) Int. Cl.
    *G02B 26/00*  (2006.01)
(52) U.S. Cl.
    USPC ..................... 359/296; 359/290; 345/107
(58) Field of Classification Search
    USPC .................. 359/237–324; 345/107
    See application file for complete search history.

(56) References Cited

U.S. PATENT DOCUMENTS

| | | | |
|---|---|---|---|
| 2009/0109172 A1* | 4/2009 | Lee et al. | 345/107 |
| 2010/0201657 A1* | 8/2010 | Miyazaki | 345/205 |
| 2011/0043543 A1* | 2/2011 | Chen et al. | 345/690 |

FOREIGN PATENT DOCUMENTS

TW  201042349 A1  12/2010

OTHER PUBLICATIONS

TW Office Action that this art reference was cited.

* cited by examiner

*Primary Examiner* — Darryl J Collins
*Assistant Examiner* — Gary O'Neill
(74) *Attorney, Agent, or Firm* — CKC & Partners Co., Ltd.

(57) ABSTRACT

A color electrophoretic display includes a substrate, a segment electrode circuit layer, a transparent electrode layer, an electrophoretic display medium layer, and a colored polymer film. The segment electrode circuit layer is disposed on the substrate and is configured to display a letter and/or a pattern. The transparent electrode layer is disposed opposing the segment electrode circuit layer, and the electrophoretic display medium layer is disposed between the segment electrode circuit layer and the transparent electrode layer. The electrophoretic display medium layer is controlled by an electric field that is produced and varied by the segment electrode circuit layer and the transparent electrode layer to change brightness. The color polymer film is disposed on the transparent electrode layer to produce color. The colored polymer film includes a polymer layer and pigment particles distributed in the polymer layer.

13 Claims, 3 Drawing Sheets

COLOR ELECTROPHORETIC DISPLAY

RELATED APPLICATIONS

This application claims priority to Taiwan Application Serial Number 100122679, filed Jun. 28, 2011, which is herein incorporated by reference.

BACKGROUND

1. Field of Invention

The present invention relates to an electrophoretic display. More particularly, the present invention relates to a color electrophoretic display.

2. Description of Related Art

An electrophoretic display is a non-emissive device that is made based on the electrophoresis phenomenon in which charged pigment particles are suspended in a dielectric solvent. The electrophoretic display was first proposed in 1969. Such a display typically includes two boards having electrodes disposed thereon. These two boards are placed opposite to each other and are separated by a partition. Typically, one of the boards is transparent. Passive electrophoretic displays usually require a top board (i.e., the board that forms the viewing surface) and a bottom board with electrodes thereon to drive the display, while active electrophoretic displays require a thin film transistor array disposed on a bottom board thereof and a non-patterned transparent electrode substrate disposed on a top board thereof. Electrophoresis fluid having charged pigment particles is sealed between two electrode plates. The charged pigment particles move to one side or the other when a voltage difference is applied between two electrodes to thereby realize the display of images.

Electrophoretic displays consume power only at the instant when an image is changed, and such operation results in a reduction in power consumption. On the other hand, since electrophoretic displays can reflect light, users can use electrophoretic displays in the dark only when an appropriate front light is provided. Another significant drawback is that it is difficult to provide color with respect to the electrophoretic display medium, such that the presentation of colors is not easily realized in the electrophoretic display. Hence, there is a need for a new electrophoretic display which can easily present colors.

SUMMARY

According to one embodiment of the present invention, a color electrophoretic display includes a substrate, a segment electrode circuit layer, a transparent electrode layer, an electrophoretic display medium layer, and a colored polymer protection film.

The segment electrode circuit layer is disposed on the substrate and is configured to display at least one of a letter and a pattern. The transparent electrode layer is disposed opposing the segment electrode circuit layer. The electrophoretic display medium layer is disposed between the segment electrode circuit layer and the transparent electrode layer. The electrophoretic display medium layer is controlled by an electric field that is produced and varied by the segment electrode circuit layer and the transparent electrode layer to change brightness. The colored polymer protection film is disposed on the transparent electrode layer for producing color. The colored polymer protection film includes a polymer layer and a plurality of pigment particles distributed in the polymer layer.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
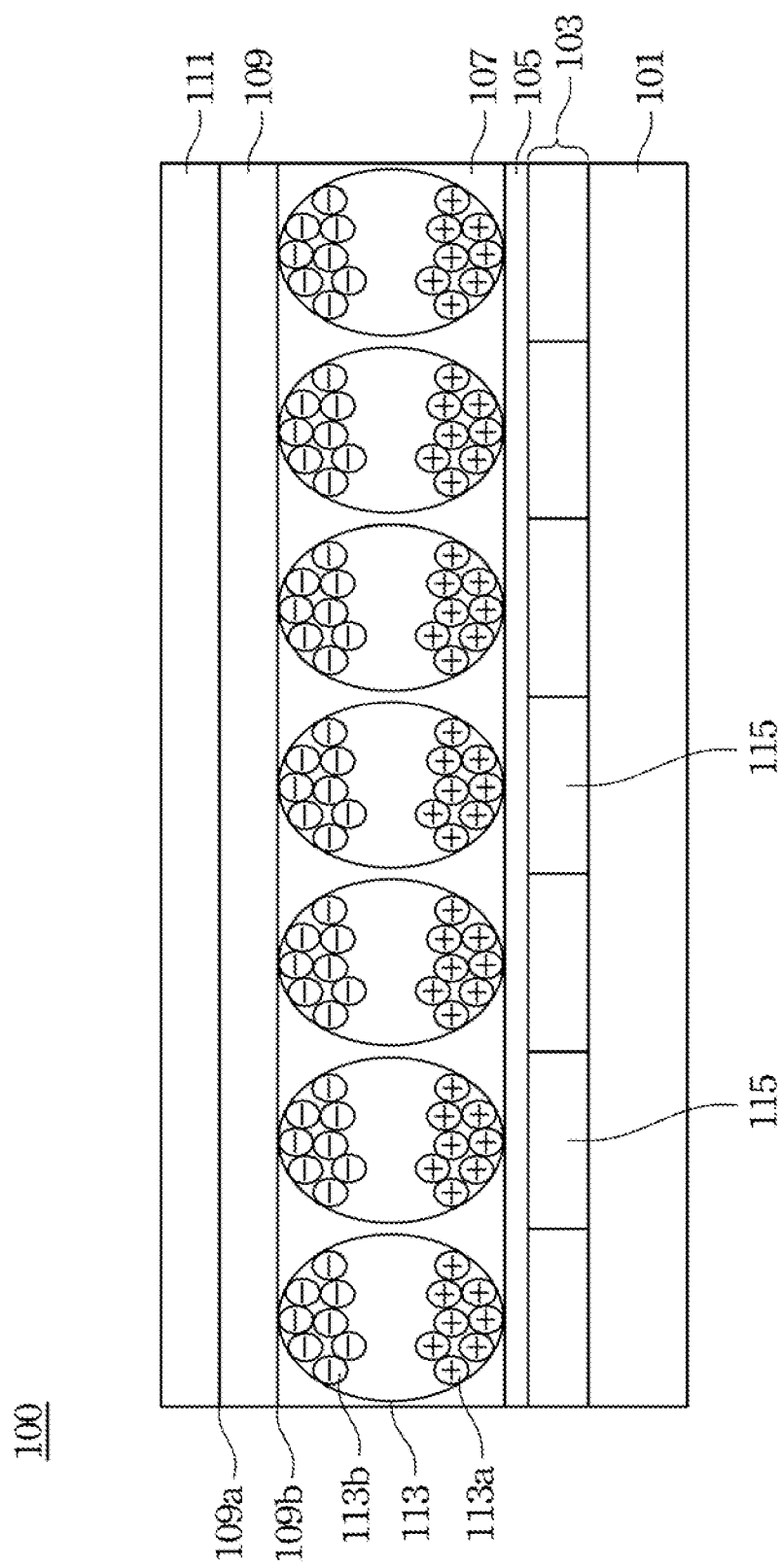
FIG. 1A shows a cross-sectional view of the structure of a color electrophoretic display according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

In a color electrophoretic display of the following embodiment, a colored polymer protection film is attached to a transparent electrode for displaying letters and patterns in a manner including colors, thereby allowing for application to electronic classification tags, electronic watches, etc. The to colored polymer protection film can be further doped with a phosphor material to be a light source when the light is dim.

Figure 1B:
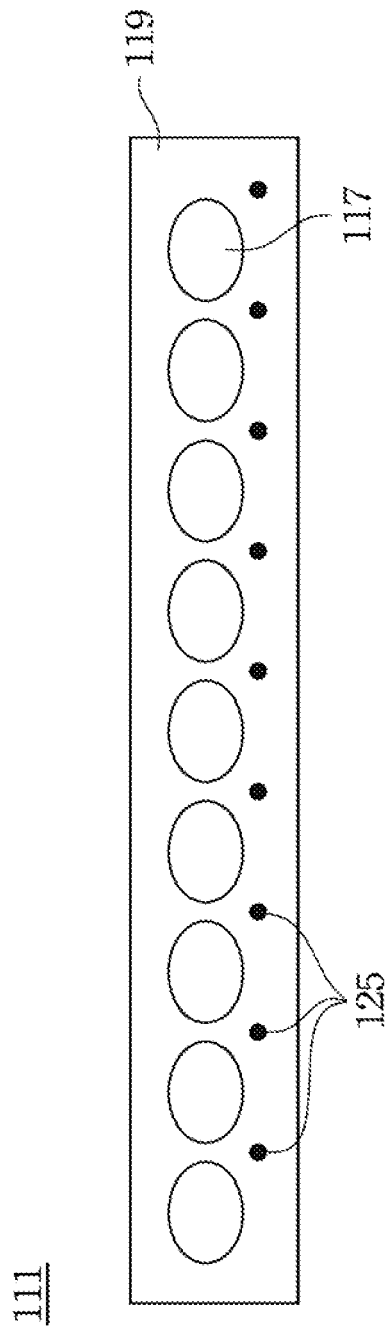
FIG. 1B shows a diagram of a colored polymer protection film according to one embodiment of the present invention.
Figure 1C:
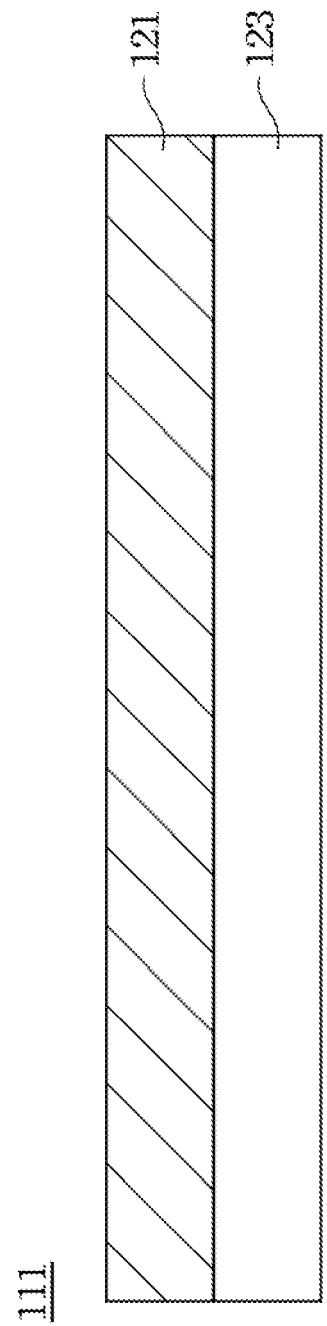
FIG. 1C shows a diagram of a colored polymer protection film according to another embodiment of the present invention.

FIG. 1A shows a cross-sectional view of the structure of a color electrophoretic display according to one embodiment of the present invention, and FIG. 1B and FIG. 1C show diagrams of a colored polymer protection film according to two embodiments of the present invention. The color electrophoretic display 100 includes a substrate 101, a segment electrode circuit layer 103, a transparent electrode layer 109, an electrophoretic display medium layer 107, and a colored polymer protection film 111.

The substrate 101 can be a glass substrate, a plastic substrate, or a flexible substrate, and the segment electrode circuit layer 103, which is disposed on the substrate 101, is configured to display at least one of a letter and a pattern. Particularly, the segment electrode circuit layer 103 includes segment electrodes 115 for displaying a letter, number or pattern. For example, the segment electrode circuit layer 103 can include seven of the segment electrodes 115 provided in the form of a seven-segment display so that the numbers 0 to 9 may be easily formed. The transparent electrode layer 109 is disposed opposing the segment electrode circuit layer 103 and cooperates with the segment electrode circuit layer 103. In some embodiments, an adhesive layer 105 is adhered to the segment electrode circuit layer 103 for protecting the segment electrode circuit layer 103.

The electrophoretic display medium layer 107 is disposed between the segment electrode circuit layer 103 and the transparent electrode layer 109. The electrophoretic display medium layer 107 is controlled by an electric field that is produced and varied by the segment electrode circuit layer 103 and the transparent electrode layer 109 to change brightness. The electrophoretic display medium layer 107 can be a microcapsule-type electrophoretic display medium layer (E-Ink), a micro-cup electrophoretic display medium layer, or an electronic liquid powder electrophoretic display medium layer. In this embodiment, the electrophoretic display medium layer 107 is a microcapsule-type electrophoretic display medium layer.

The electrophoretic display medium layer 107 includes several microcapsules 113, and each of the microcapsules 113 has several first charged particles 113a and several second charged particles 113b. The color and the polarity of the first charged particles 113a are different from those of the second charged particles 113b. The first charged particles 113a and the second charged particles 113b respectively have a positive charge and a negative charge. When an electric field is changed by the segment electrode circuit layer 103 and the transparent electrode layer 109, the first charged particles 113a and the second charged particles 113b move, such that brightness is changed.

In some embodiments, the transparent electrode layer 109 has a first surface 109a and a second surface 109b opposite the first surface 109a and facing the electrophoretic display medium layer 107, and the colored polymer protection film 111 is disposed on the first surface 109a of the transparent electrode layer 109.

In the embodiment shown in FIG. 1B, the colored polymer protection film 111, which is disposed on the transparent electrode layer 109 for producing color, includes a polymer layer 119 and several pigment particles 117 distributed in the polymer layer 119. The pigment particles 117 enable the colored polymer protection film 111 to exhibit a predetermined shielding effect and to be able to present various colors. Therefore, pigment particles 117 having a better shielding effect, better tinting ability, better brightness, and better photo stability are required so that the colored polymer protection film 111 can function well in various climates.

As described above, the pigment particles 117 are distributed in the polymer layer 119. In some embodiments, the pigment particles 117 are evenly distributed in the polymer layer 119 of the colored polymer protection film 111, such that the colored polymer protection film 111 can evenly present color. In other embodiments, the pigment particles 117 are distributed in peripheral areas of the polymer layer 119 of the colored polymer protection film 111 such that the color in the peripheral areas of the polymer layer 119 is different from the color in the middle part of the polymer layer 119. Moreover, if the colored polymer protection film 111 has a single color, then the color of the pigment particles 117 can be any one of red, orange, yellow, green, blue, indigo, or purple. In some embodiments, if the colored polymer protection film 111 has multiple colors, then the pigment particles 117 may include a number of red particles, a number of green particles, and a number of blue particles.

The colored polymer protection film 111 is doped with phosphor 125 for use as a light source, as shown in FIG. 1B.

In the embodiment shown in FIG. 1C, the colored polymer protection film 111 can also be a multilayer polymer film formed including a color film 121 adhered to a colorless polymer film 123.

In addition, the colored polymer protection film 111 can be an anti-glare film, an antireflection film, an ultraviolet (UV) light blocking film, a water blocking film, or an anti-scratch film.

Figure 2B:
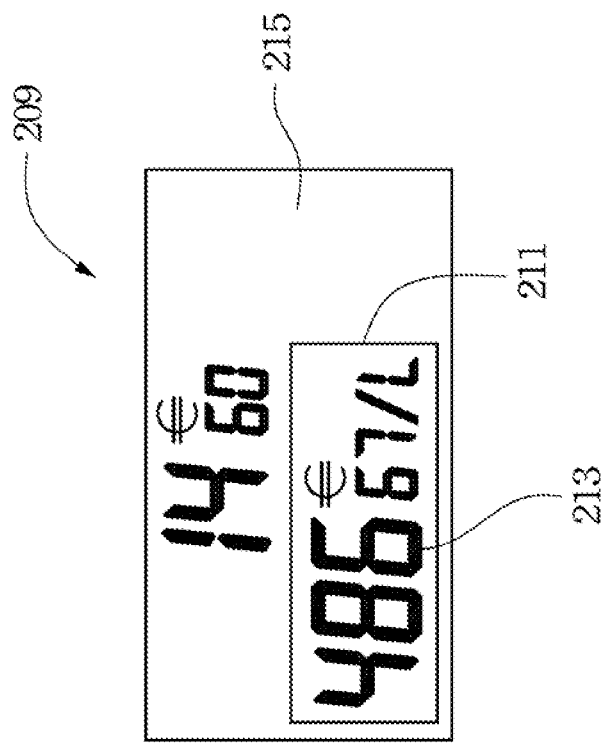
FIG. 2B shows a diagram of a color electrophoretic display according to another embodiment of the present invention.
Figure 2A:
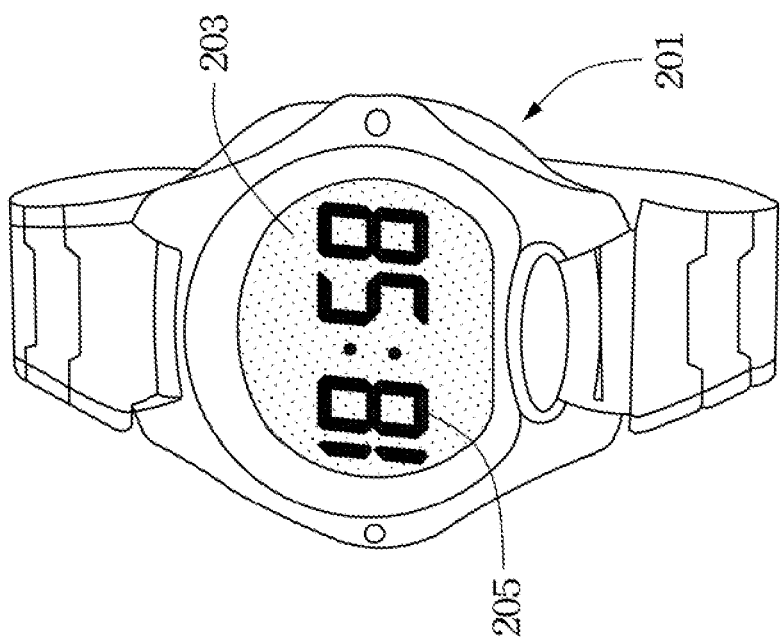
FIG. 2A shows a diagram of a color electrophoretic display according to one embodiment of the present invention.

FIG. 2A and FIG. 2B shows diagrams of a color electrophoretic display according to two embodiments of the present invention. In FIG. 2A, a digital watch 201 adopts a color electrophoretic display 203 of the present invention. The color electrophoretic display 201 can present various colors, and includes several sets of segment electrodes 205, in which each set of the segment electrodes 205 is formed as a seven-segment display that can show numbers and patterns. That is, each such set of the segment electrodes 205 can show the numbers 0-9 and also show letters which may be formed into a word with the other sets of the segment electrodes 205. In FIG. 2B, a color electrophoretic display 209 of this embodiment functions as an electronic label and includes two colored polymer protection films, namely, a colored polymer protection film 211 and a colored polymer protection film 215 for presenting two colors. Moreover, several sets of segment electrodes 213 of the color electrophoretic display 209 are used for presenting numbers and letters.

The color electrophoretic display of the above embodiments utilizes the color protection film or the protection film with a color film in the display to produce color and to protect the elements provided therein. Additional phosphor can be added into the protection film to function as a light source when the light is dim. With the segment electrodes, patterns, letters, or numbers can be shown with a colorful background, such that the color electrophoretic display can be applied in various electronic products. By changing the color of the protection film, patterns letters, and numbers can be shown with different background colors, which simplifies the process and reduces the cost for providing color in the electrophoretic display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color electrophoretic display, having an inner display region and an outer display region extending from an edge of the color electrophoretic display to the inner display region, the outer display region encircling and adjoining the inner display region, the color electrophoretic display comprising:
    a substrate;
    a segment electrode circuit layer disposed on the substrate and configured to display a first symbol within the inner display region and a second symbol within the outer display region;
    a transparent electrode layer disposed opposing the segment electrode circuit layer;
    an electrophoretic display medium layer disposed between the segment electrode circuit layer and the transparent electrode layer, wherein the electrophoretic display medium layer is controlled by an electric field that is produced and varied by the segment electrode circuit layer and the transparent electrode layer to change brightness; and
    a colored polymer protection film disposed on the transparent electrode layer, and comprising:
        a middle part including a plurality of first pigment particles dispersed among the middle part and configured to show a first background color of the first symbol within the inner display region; and
        a peripheral part including a plurality of second pigment particles dispersed among the peripheral part that extends from an edge of the colored polymer protection film to the middle area, the peripheral part encircling and adjoining the middle part, the second pigment particles configured to show a second background color of the second symbol within the outer display region.

2. The color electrophoretic display as claimed in claim 1, further comprising an adhesive layer adhered to the segment electrode circuit layer for protecting the segment electrode circuit layer.

3. The color electrophoretic display as claimed in claim 1, wherein the transparent electrode layer has a first surface and a second surface opposite the first surface and facing the electrophoretic display medium layer, and the colored polymer protection film is disposed on the first surface of the transparent electrode layer.

4. The color electrophoretic display as claimed in claim 1, wherein the first pigment particles are evenly distributed in the middle part of the colored polymer protection film such that the middle part of colored polymer protection film evenly presents the first background color, and the second pigment particles are evenly distributed in the peripheral part of the colored polymer protection film such that the peripheral part of colored polymer protection film evenly presents the second background color that is different from the first background color.

5. The color electrophoretic display as claimed in claim 1, wherein each of the first pigment particles has a color of red, orange, yellow, green, blue, indigo, or purple, and each of the second pigment particles has a color of red, orange, yellow, green, blue, indigo, or purple.

6. The color electrophoretic display as claimed in claim 1, wherein the first pigment particles include a plurality of red particles, a plurality of green particles, and a plurality of blue particles.

7. The color electrophoretic display as claimed in claim 1, wherein the colored polymer protection film comprises a multilayer polymer film including a color film adhered to a colorless polymer film.

8. The color electrophoretic display as claimed in claim 1, wherein the colored polymer protection film is doped with phosphor for use as a light source.

9. The color electrophoretic display as claimed in claim 1, wherein the colored polymer protection film is an anti-glare film, an antireflection film; an ultraviolet light blocking film, a water blocking film, or an anti-scratch film.

10. The color electrophoretic display as claimed in claim 1, wherein the electrophoretic display medium layer is a microcapsule-type electrophoretic display medium layer, a microcup electrophoretic display medium layer, or an electronic liquid powder electrophoretic display medium layer.

11. The color electrophoretic display as claimed in claim 1, wherein the substrate is a glass substrate, a plastic substrate, or a flexible substrate.

12. The color electrophoretic display as claimed in claim 1, wherein the segment electrode circuit layer comprises seven of the segment electrodes provided in the form of a seven-segment display.

13. A color electrophoretic display, comprising:
a substrate having a first region and a second region surrounding the first region;
a segment electrode circuit layer disposed on the substrate, wherein the segment electrode circuit layer occupies the first region for showing a visible pattern, and the second region is not occupied by the segment electrode circuit layer;
a transparent electrode layer disposed opposing the segment electrode circuit layer;
an electrophoretic display medium layer disposed between the segment electrode circuit layer and the transparent electrode layer, wherein the electrophoretic display medium layer is controlled by an electric field that is produced and varied by the segment electrode circuit layer and the transparent electrode layer; and
a colored polymer protection film disposed on the transparent electrode layer, and comprising:
a first portion overlapped with the segment electrode circuit layer on the first region, and
a second portion surrounding the first portion and extended from an edge of the colored polymer protection film to the first portion, wherein the second portion has a plurality of pigment particles dispersed among the second portion for showing a background color of the visible pattern, and is not overlapped with the segment electrode circuit layer on the first region when viewed in a direction perpendicular to the substrate.

* * * * *